(12) United States Patent
Druart et al.

(10) Patent No.: US 9,102,564 B2
(45) Date of Patent: Aug. 11, 2015

(54) GLASS FIBRE COMPOSITION AND COMPOSITE MATERIAL REINFORCED THEREWITH

(75) Inventors: Hendrik Druart, Battice (BE); Yves Houet, Battice (BE); Dimitri Laurent, Battice (BE); Oleg Prokhorenko, Dearborn, MI (US)

(73) Assignee: 3B FIBREGLASS SPRL, Battice (BE)

( * ) Notice: Subject to any disclaimer, the term of this patent is extended or adjusted under 35 U.S.C. 154(b) by 72 days.

(21) Appl. No.: 13/576,300

(22) PCT Filed: Feb. 4, 2011

(86) PCT No.: PCT/EP2011/051677
§ 371 (c)(1),
(2), (4) Date: Oct. 11, 2012

(87) PCT Pub. No.: WO2011/095601
PCT Pub. Date: Aug. 11, 2011

(65) Prior Publication Data
US 2013/0137565 A1    May 30, 2013

(30) Foreign Application Priority Data
Feb. 5, 2010    (EP) .................................... 10152828

(51) Int. Cl.
C03C 13/00    (2006.01)
C03C 13/06    (2006.01)
C03C 3/091    (2006.01)
C03C 3/087    (2006.01)

(52) U.S. Cl.
CPC ............... *C03C 13/00* (2013.01); *C03C 3/087* (2013.01); *C03C 3/091* (2013.01); *C03C 13/06* (2013.01)

(58) Field of Classification Search
CPC ...... C03C 13/00; C03C 13/001; C03C 13/06; C03C 3/091; C03C 3/087
USPC .......................................... 501/35, 36, 66, 70
See application file for complete search history.

(56) References Cited

U.S. PATENT DOCUMENTS

| 3,892,581 | A |   | 7/1975  | Burgman et al. |       |
|-----------|---|---|---------|----------------|-------|
| 4,381,960 | A |   | 5/1983  | Pinter et al.  |       |
| 5,789,329 | A |   | 8/1998  | Eastes et al.  |       |
| 5,935,886 | A | * | 8/1999  | Jensen et al.  | 501/36|
| 6,218,322 | B1|   | 4/2001  | Perander et al.|       |
| 6,346,494 | B1| * | 2/2002  | Jensen et al.  | 501/36|
| 6,949,483 | B2| * | 9/2005  | Jensen et al.  | 501/35|
| 7,799,713 | B2|   | 9/2010  | Hofmann et al. |       |
| 7,823,417 | B2|   | 11/2010 | Hoffmann et al.|       |
| 2003/0116262 | A1 |   | 6/2003 | Stiesdal et al. |       |
| 2005/0085369 | A1 | * | 4/2005 | Jensen         | 501/35|
| 2007/0087139 | A1 |   | 4/2007 | Creux et al.   |       |
| 2009/0286440 | A1 |   | 11/2009| Lecomte et al. |       |
| 2010/0184345 | A1 |   | 7/2010 | Lalande et al. |       |
| 2011/0039681 | A1 |   | 2/2011 | Lecomte        |       |
| 2012/0135849 | A1 | * | 5/2012 | Hoffman et al. | 501/38|

FOREIGN PATENT DOCUMENTS

| CA | 1045641    | 1/1979  |
| FR | 1435073    | 4/1966  |
| GB | 520246     | 4/1940  |
| JP | 58064243   | 4/1983  |
| WO | 9840321    | 9/1998  |
| WO | 2004110944 | 12/2004 |
| WO | 2006064164 | 6/2006  |
| WO | 2007055964 | 5/2007  |
| WO | 2007055968 | 5/2007  |
| WO | 2008142347 | 11/2008 |
| WO | 2009138661 | 11/2009 |

OTHER PUBLICATIONS

International Search Report for PCT/EP2011/051677, Completed by the European Patent Office on Apr. 28, 2011, 3 Pages.
Osborn et al. Journal of Metals Jan. 1954, vol. 6, p. 33-45, "Optimum Composition of Blast Furnace Slag as Deduced from Liquids Data for the Quaternary System CaO-MgO-Al2O3-SiO2."
Andersen. American Journal of Science—Fourth Series 1915, vol. 39, No. 232, 24 pages. "The System Anorthite-Forsterite-Silica."
Lisenenkov. Glass Physics and Chemistry 1981, vol. 7, No. 5, p. 584-594, English Translation attached to original, "Distribution of Calcium and Magnesium Cations Between Silicate and Aluminosilicate Anions." All together 36 Pages.

* cited by examiner

*Primary Examiner* — Anthony J Green
*Assistant Examiner* — Elizabeth A Bolden
(74) *Attorney, Agent, or Firm* — Brooks Kushman P.C.

(57) ABSTRACT

A glass fiber of quaternary composition including $SiO_2$, $Al_2O_3$, CaO, and MgO, each present in an amount of at least 5 wt. %, and having less than 3.3 wt. % $B_2O_3$, and less than 2.0 wt. % fluorine, wherein: 22.0<MgO+CaO=<35.0 wt %, and 27.0<MgO+$Al_2O_3$=<44.0 wt %. all amounts being expressed in weight % with respect to the total weight of the composition. Also disclosed is a method of making composite materials reinforced with such fibers, and their use in applications such as windmill blades, pressure vessels, components in the automotive, machinery, aerospace applications, and such products produced therewith.

15 Claims, 4 Drawing Sheets

GLASS FIBRE COMPOSITION AND COMPOSITE MATERIAL REINFORCED THEREWITH

CROSS-REFERENCE TO RELATED APPLICATION

This application is the U.S. national phase of PCT Appln. No. PCT/EP2011/051677 filed on Feb. 4, 2011, which claims priority to European Patent Application No. 10152828.9 filed on Feb. 5, 2010, the disclosures of which are incorporated in their entirety by reference herein.

FIELD OF THE INVENTION

The present invention relates to the field of glass fibres, in particular of compositions of glass fibres suitable as reinforcement of high performance fibre reinforced organic or inorganic matrix composite materials. It finally relates to products, such as windmill blades comprising a polymeric shell or skin reinforced with the above glass fibres.

BACKGROUND OF THE INVENTION

Glass fibre compositions suitable as reinforcement for composite materials have been described for a long time. In 1966, FR1435073 disclosed a composition for a so-called R-glass fibre comprising 50 to 65 wt % $SiO_2$, 20 to 30 wt % $Al_2O_3$, 5 to 20 wt % MgO, and 6 to 16 wt % CaO. These fibres with higher mechanical strength than the more commonly known E-glasses are, however, hindered by rather severe processing conditions, in particular high processing temperatures and more problematic fiberization, which all contribute to their higher cost compared with E-glass.

E-glass is probably the most common type of glass used in continuous fibre reinforced composites. E-glass generally comprises 52 to 56 wt % $SiO_2$, 12 to 16 wt % $Al_2O_3$, 0 to 5 wt % MgO, 16 to 25 wt % CaO, and 5 to 10 wt % $B_2O_3$, and minor amounts of alkaline oxides like $Na_2O$ and $K_2O$. E-glass is usually used as the reference fibre with which the performance of new glass compositions is compared. Boron free E-glass compositions have been proposed, e.g., in U.S. Pat. No. 5,789,329 with 59 to 62 wt % $SiO_2$, 12 to 15 wt % $Al_2O_3$, 1 to 4 wt % MgO, 20 to 24 wt % CaO, and minor amounts of alkaline oxides like $Na_2O$ and $K_2O$.

S-glass is a glass generally having higher mechanical strength than E-glasses and comprising about 65 wt % $SiO_2$, 25 wt % $Al_2O_3$, and 10 wt % MgO. As can be seen from the above review, E- and S-glass fibres usually have a low (MgO+$Al_2O_3$) content, whilst the (MgO+$Al_2O_3$) content in R-glass fibres is quite high with contents of at least 25 wt %, and wherein amounts greater than 40 wt % are common.

A multitude of quaternary glass fibre compositions comprising $SiO_2$, $Al_2O_3$, CaO, and MgO as major components, within and around the three main R-, E-, S-glass types revised supra have been proposed in the literature.

GB520246 filed in 1938 discloses a quaternary fibre composition comprising either boron or fluorine in rather high amounts, not admissible nowadays. It also discloses a couple of boron and fluorine free compositions which distinguish themselves from the boron and fluorine containing compositions in a substantially lower cumulated amount of MgO and CaO. These fibres are not suitable for reinforcement in composite materials as they are designed for use as insulation sheath for electrical cables.

In GB1391384 a glass fibre composition is disclosed comprising no boron and showing acceptable viscosity and liquidus temperature. The glass fibres disclosed in this document comprise, 54-64 wt % $SiO_2$, 9-19 wt % $Al_2O_3$, 9-25 wt % CaO, 0-10 wt % MgO, and various oxides in amounts less than 6 wt %.

WO2007/055964 and WO2007/055968 propose glass compositions yielding fibres with higher mechanical properties and enhanced resistance to temperature and acids than E-glasses with good forming capability. They are characterized by a content of 60.5-70.5 wt % $SiO_2$, 10-24.5 wt % $Al_2O_3$, and 6-20 wt % of RO (=MgO+CaO+SrO). The glass fibres cited in the examples comprise 4.8-14 wt % CaO, and 5.0-11.3 wt % MgO.

EP1641717 discloses glass fibres with mechanical properties comparable with the ones of R-glass, as disclosed in FR1435073, and yielding enhanced processing properties, in particular, melting and fiberization conditions. The glass fibres proposed in EP1641717 comprise 50-65 wt % $SiO_2$, 12-20 wt % $Al_2O_3$, 12-17 wt % CaO, and 6-12 wt % MgO, with a combined amount of (MgO+$Al_2O_3$) preferably larger than 24 wt %.

WO2009/138661 teaches that a glass fibre having a high modulus and a liquidus temperature of 1250° C. or less can be obtained with a formulation comprising 50-65 wt % $SiO_2$, 12-23 wt % $Al_2O_3$, 1-10 wt % CaO, and 6-12 wt % MgO. The sum of $SiO_2$ and $Al_2O_3$ should be greater than 79 wt %.

WO9840321 describes a glass fibre suitable for heat and sound insulation in the building industry comprising 50-60 wt % $SiO_2$, 1-6 wt % $Al_2O_3$, 16-22 wt % MgO, and 12-18 wt % CaO. The use of this glass as reinforcement for composite materials is not disclosed.

CA1045641 and U.S. Pat. No. 3,892,581 disclose glass fibres for composites reinforcement comprising 53-57.3 wt % $SiO_2$, 16.3-18.5 wt % $Al_2O_3$, 8.5-12.7 wt % CaO, and 6.6-10.5 wt % MgO. Similarly, WO2006/064164 describes glass fibres for reinforcement of composite materials with broader content ranges than the preceding compositions, comprising 50.0-65.0 wt % $SiO_2$, 12.0-20.0 wt % $Al_2O_3$, 12.0-17.0 wt % CaO, and 6.0-12.0 wt % MgO.

WO2008/142347 discloses low cost glass fibre formulations providing excellent trade-off between mechanical properties and production conditions. They comprise rather low combined amounts of (MgO+$Al_2O_3$), with 62.0-72.0 wt % $SiO_2$, 4.0-11.0 wt % $Al_2O_3$, 8.0-22.0 wt % CaO, and 1.0-7.0 wt % MgO.

JP58064243 discloses a glass fibre composition yielding enhanced elasticity and heat resistance comprising relatively low amounts of MgO and CaO compared with high amounts of $Al_2O_3$, with amounts of $SiO_2$ comprised between 45 and 70 wt. %, of $Al_2O_3$ comprised between 20 and 35 wt. %, and cumulated amounts of MgO and CaO comprised between 10 and 23 wt. %.

In spite of the extensive research done to date to develop glass fibre compositions with enhanced properties, there still is a need to find glass fibres combining high mechanical, physical and chemical properties with production cost effectiveness.

SUMMARY OF THE INVENTION

1. The present invention is defined in the appended independent claims. Preferred embodiments are defined in the dependent claims. The present invention provides a glass fibre of quaternary composition comprising $SiO_2$, $Al_2O_3$, CaO, and MgO as major components, each present in an amount of at least 5 wt. %, and comprising less than 3.3 wt. % $B_2O_3$, and less than 2.0 wt. % fluorine, characterized by:

22.0<MgO+CaO≤35.0 wt %, and $27.0 \leq MgO+Al_2O_3 < 44.0$ wt %.

all amounts being expressed in weight % with respect to the total weight of the composition.

In the context of the present invention, a "major component" should be understood as a component present in an amount of at least 5 wt % of the total weight of the composition. The compositions of the present invention are characterized by higher contents of both (MgO+CaO) and (MgO+$Al_2O_3$) in combination, when compared with the compositions of the prior art.

In a preferred embodiment, glass fibres according to the present invention are characterized by:
(MgO+$Al_2O_3$)≥28.5 wt %, and/or
(MgO+$Al_2O_3$)≤40.0 wt %, preferably ≤38.0 wt %.

The content of (MgO+CaO) is preferably at least 22.5 wt %, more preferably at least 23.0 wt %, most preferably at least equal to 24.0 wt %. The cumulated content of MgO+$Al_2O_3$ is preferably comprised between 28 and 43 wt. %, more preferably between 30 and 40 wt. %.

The quaternary compositions of the present invention may comprise from 45 to 65 wt % $SiO_2$, 7 to 25 wt % $Al_2O_3$, 5 to 20 wt % CaO, and 8 to 25 wt % MgO, and preferably the content of (MgO+CaO) is at least 25 wt %. It is advantageous if the content of MgO is comprised between 11 and 23 wt %, and preferably greater than 12 wt %, most preferably at least 13 or at least 15 wt %. Good results are obtained when:
7 wt %≤$Al_2O_3$<20 wt %, preferably $Al_2O_3$≥13 wt %, and/or
12 wt %<MgO≤22 wt %, preferably, MgO≤20 wt %.

Advantageously, the combined content of ($SiO_2$+$Al_2O_3$) of the glass fibres of the present invention is less than 79 wt %. Boron is preferably present in amounts of less than 3.0 wt. %, more preferably less than 2.0 wt. %, more preferably less than 1.0 wt. %. Similarly, fluorine is preferably present in amounts less than 1.5 wt. %, more preferably less than 1.0 wt. %, more preferably less than 0.5 wt. %. The presence of neither fluorine nor boron is essential in the formulations of the present invention, and in yet a preferred embodiment, the composition comprises substantially no boron nor fluorine (bar traces present in the natural minerals used), to avoid the well known drawbacks associated with these components.

The glasses according to the present invention are preferably characterized by:
A $SiO_2$/(MgO+CaO) ratio comprised between 1.80 and 2.30, preferably between 1.8 and 2.28, more preferably between 1.84 and 2.28 and/or
MgO/(MgO+CaO) ratio greater than 15%.

In another embodiment, the glass fibres are characterized by:
$SiO_2$/(MgO+CaO) ratio is comprised between 1.30 and 2.0, and/or
$Al_2O_3$/(MgO+CaO) ratio is comprised between 15 and 120%.

The present invention also concerns a composite material comprising an organic or inorganic matrix reinforced with glass fibres as described supra. The glass fibres of the present invention are particularly suitable for applications where high performance composites are needed, in particular in applications such as windmill blades, pressure vessels, components in the automotive, machinery, ballistics, and aerospace applications. In particular, windmill blades generally consist of a hollow shell or a skin-core structure, wherein the shell or skin are made of a polymeric material (e.g., thermoset resins such as epoxy or polyesters, or thermoplastic polymers such as PET, PP) reinforced by long, preferably continuous fibres. The present invention also concerns windmill blades and other products comprising a polymeric matrix reinforced with glass fibres as defined supra.

DETAILED DESCRIPTION OF THE INVENTION

The glass fibre compositions of the present invention are defined as quaternary because they comprise at least 5 wt % of the following four components: $SiO_2$, $Al_2O_3$, CaO, and MgO.

Silicia, $SiO_2$, as network forming oxide of glass, is the principal component of glass and is preferably present in an amount comprised between 45 and 65 wt %, more preferably between 47 and 59 wt %. Increasing the amount of $SiO_2$ generally increases the viscosity of the melt.

Figure 1:
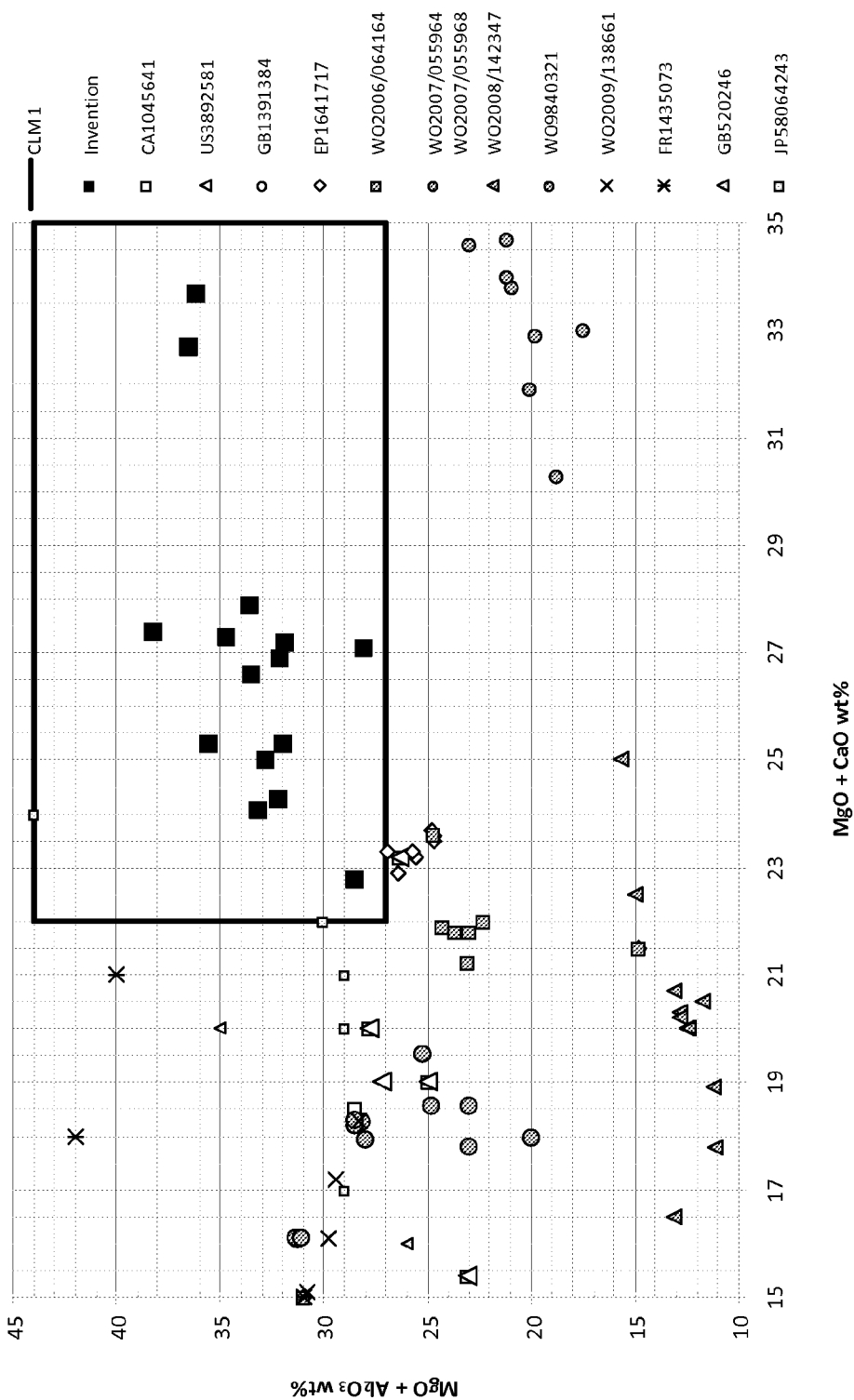
FIG. 1: shows a plot of the (MgO+CaO) vs (MgO+$Al_2O_3$) of glass compositions according to the present invention compared with the glass fibre formulations of the prior art revised supra.

Alumina, $Al_2O_3$, is also a network forming oxide of glass and, according to the present invention, it is present, in combination with MgO, in an amount of not more than 45 wt % as depicted in FIG. 1 by the top horizontal thick solid line. It is preferred to have combined amounts of (MgO+$Al_2O_3$) not more than 40 wt %, even not more than 38.5 wt % as high amounts of (MgO+$Al_2O_3$) tend to yield high liquidus temperatures, thus hindering spinnability as can be seen in FR1435073 with a liquidus temperature of 1350° C. for a combined amount (MgO+$Al_2O_3$) of 40 to 42 wt %. According to the present invention, $Al_2O_3$ is preferably present in an amount of at least 7 wt % and less than 25 wt %, more preferably, less than 20 wt %. Higher amounts of alumina may be detrimental to the viscosity of the melt and increase the risks of devitrification. Preferably, the amount of $Al_2O_3$ is at least 13 wt % and, more preferably, the combined content of ($SiO_2$+$Al_2O_3$) is less than 79 wt %. This range of $Al_2O_3$ can be considered as intermediate when compared with the prior art and, in combination with MgO in the claimed combined amounts, it allows for a high modulus with low processing temperature and viscosity (T log 3).

As mentioned supra, magnesia, MgO, according to the present invention is present, in combination with $Al_2O_3$, in an amount not exceeding 45 wt %, preferably 40 or even 38.5 wt %, as depicted in FIG. 1 by the top horizontal thick solid line. In combination with CaO, MgO is present in amounts greater than 21 wt % and not more than 35 wt % (see vertical thick solid lines on the left and right hand sides in FIG. 1). In lower amounts, the viscosity increases and the modulus decreases when compared with the claimed range. Preferably; the glass compositions of the present invention comprise an amount of MgO greater than 12 wt % and not more than 22 wt %, preferably at most 20 wt %. It is preferably present in an amount greater than 13 wt %; more preferably greater than 15 wt %. Its presence in the claimed amounts contributes to a high tensile modulus, and counteracts the negative effects of $Al_2O_3$ on devitrification. It also allows control of viscosity.

Calcia, CaO, is present in an amount of at least 5 wt % as a major component of the claimed formulations and, in combination with MgO, is present in the claimed amounts as discussed in the preceding paragraph. It is preferably present in an amount of not more than 20 wt %. CaO in these amounts permits to control the melt viscosity and devitrification. Too high amounts of CaO are reported as being detrimental to the tensile strength and modulus and to raise the liquidus temperature.

The gist of the present invention lies in the unique combination of high amounts of ($MgO+Al_2O_3$) together with high amounts of ($MgO+CaO$) which, in combination, are higher than the prior art glass fibre compositions, in particular as disclosed in JP580640243. Referring to FIG. 1, the glass compositions of the present invention are comprised within the perimeter defined by the thick solid rectangular outline, and define a totally novel type of glass fibre compositions yielding excellent mechanical properties, good durability, and cost effective processing conditions.

The glass fibres of the present invention may contain other oxides to fine tune the properties thereof. Typical examples of oxides that may enter into the composition of the present fibres are any oxide of the following elements: Li, Zn, Mn, Ce, V, Ti, Be, Sn, Ba, Zr, Sr, which may be present in an amount less than 5 wt %, typically of 0.05 to 3 wt %, preferably from 0.2 to 1.5, or 0.5 to 1.0 wt %. The glass fibres may further contain minor amounts (less than 1 wt %) of alkaline oxides like $Na_2O$ and $K_2O$. $B_2O_3$ may also be present but its use is associated with well known drawbacks and is not preferred.

Figure 3:
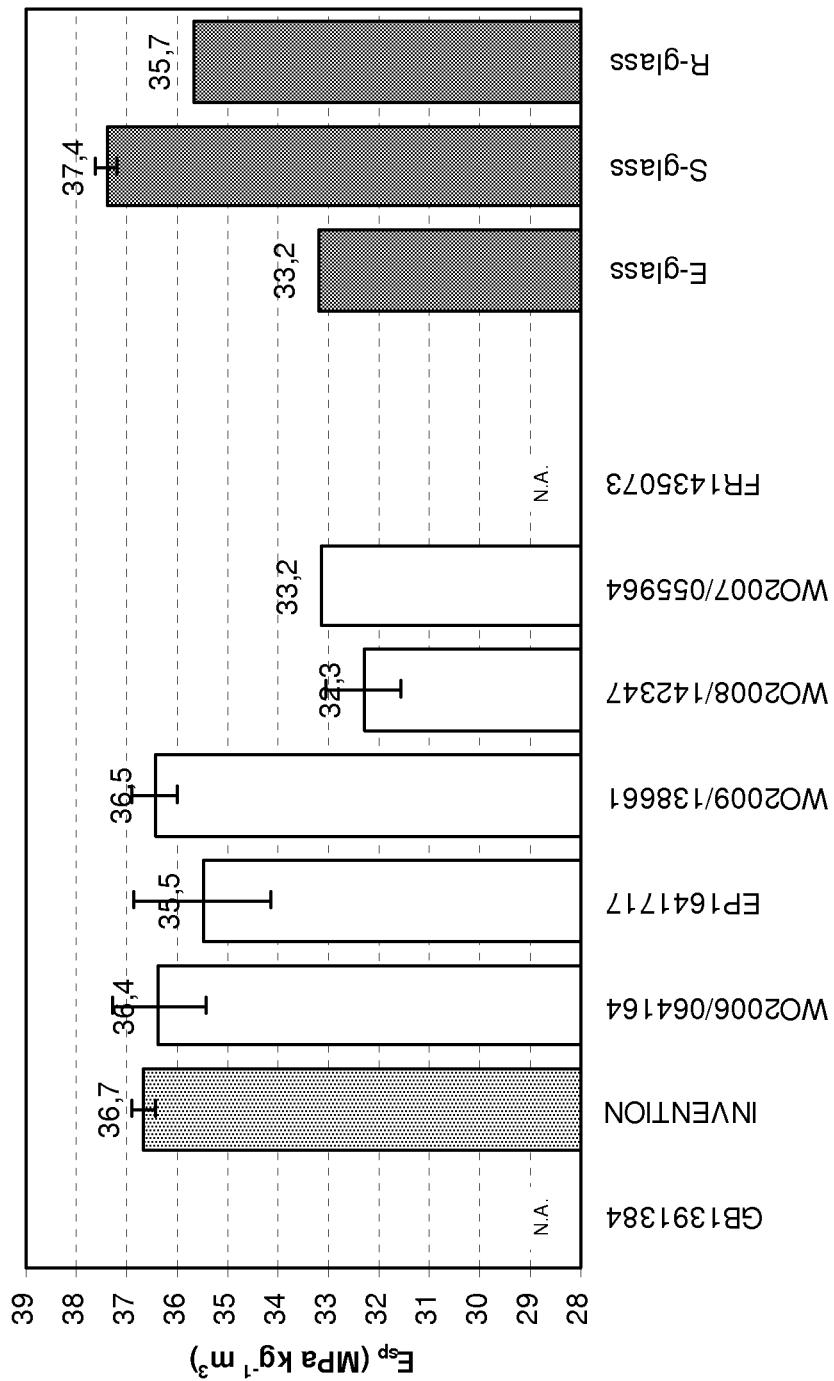
FIG. 3: shows the mean specific modulus ($E_{sp}$) of glasses according to the present invention compared with values published in the prior art revised supra.
Figure 4A:
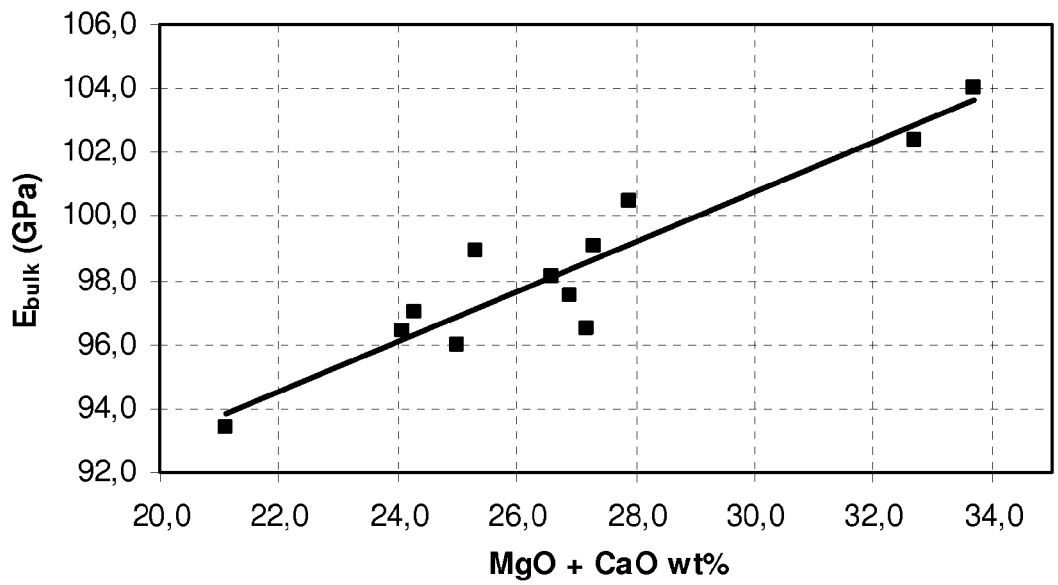
FIG. 4: shows the bulk modulus ($E_{bulk}$), (A) as a function of the (MgO+CaO) content and (B) as a function of the (MgO+$Al_2O_3$) content.
Figure 4B:
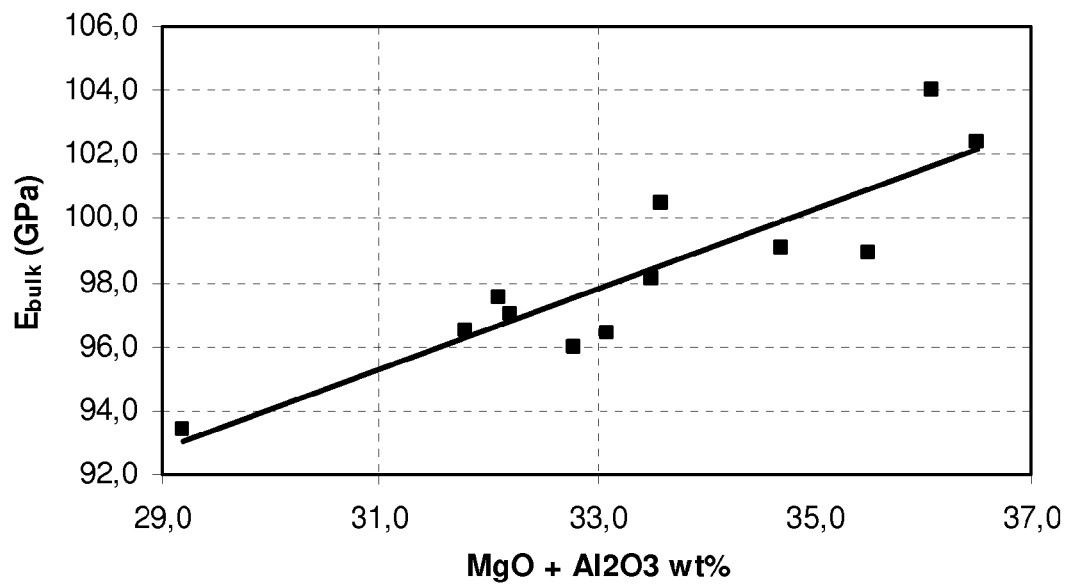

Table 1 lists the compositions of a number of glass fibres according to the present invention and represented in FIG. 1 with black squares. Table 1 also lists the measured values of the bulk modulus which lie around 100 GPa, and of the specific modulus ($E_{sp}=E_{bulk}$/density) which range between 36.4 and 37.4 MPa $kg^{-1}$ $m^3$. FIG. 3 compares the mean value of the specific modulus of the glass fibres according to the present invention with the ones of the prior art, showing the superior mechanical properties of the former, with specific moduli comparable with the ones of R- and S-glass. FIG. 4A shows how increasing the ($MgO+CaO$) content increases the bulk stiffness of the glass. The glass stiffness also increases with increasing amounts of ($MgO+Al_2O_3$) as illustrated in FIG. 4B.

TABLE 1

Class formulations according to the present invention (cf. black squares in FIG. 1)

| # | $SiO_2$ wt % | $Al_2O_3$ wt % | MgO wt % | CaO wt % | MgO + CaO wt % | MgO + $Al_2O_3$ wt % | $E_{bulk}$ GPa | $E_{sp}$ MPa $kg^{-1}$ $m^3$ |
|---|---|---|---|---|---|---|---|---|
| 1 | 47.4 | 19.8 | 16.7 | 16.0 | 32.7 | 36.5 | 102.4 | 36.8 |
| 2 | 49.8 | 22.8 | 11.9 | 15.4 | 27.3 | 34.7 | 99.1 | 36.4 |
| 3 | 48.7 | 17.5 | 18.6 | 15.1 | 33.7 | 36.1 | 104.0 | 37.4 |
| 4 | 54.6 | 17.5 | 16.1 | 11.8 | 27.9 | 33.6 | 100.5 | 37.2 |
| 5 | 55.1 | 18.0 | 14.1 | 12.8 | 26.9 | 32.1 | 97.5 | 36.2 |
| 6 | 56.5 | 18.1 | 17.4 | 7.9 | 25.3 | 35.5 | 98.9 | 37.0 |
| 7 | 58.1 | 14.7 | 17.1 | 10.1 | 27.2 | 31.8 | 96.5 | 36.1 |
| 8 | 57.9 | 17.0 | 15.8 | 9.2 | 25.0 | 32.8 | 96.0 | 36.4 |
| 9 | 58.2 | 15.2 | 18.3 | 8.3 | 26.6 | 33.5 | 98.1 | 36.7 |
| 10 | 58.9 | 16.7 | 15.5 | 8.8 | 24.3 | 32.2 | 97.0 | 36.7 |
| 11 | 60.2 | 15.6 | 17.5 | 6.6 | 24.1 | 33.1 | 96.4 | 36.8 |
| 12 | 61.7 | 17.1 | 12.1 | 9.0 | 21.1 | 29.2 | 93.4 | 36.2 |

Table 2 lists further formulations according to the present invention which are also plotted in FIG. 1.

TABLE 2

Class formulations according to the present invention (cf. black squares in FIG. 1)

| # | $SiO_2$ wt % | $Al_2O_3$ wt % | MgO wt % | CaO wt % | MgO + CaO wt % | MgO + $Al_2O_3$ wt % |
|---|---|---|---|---|---|---|
| 13 | 49.8 | 22.8 | 15.4 | 12.0 | 27.4 | 38.2 |
| 14 | 55.1 | 18.0 | 14.1 | 12.8 | 26.9 | 32.1 |
| 15 | 58.5 | 18.7 | 9.8 | 13.0 | 22.8 | 28.5 |
| 17 | 55.1 | 19.6 | 12.3 | 13.0 | 25.3 | 31.9 |
| 18 | 57.7 | 15.2 | 12.9 | 14.2 | 27.1 | 28.1 |

The compositions listed in Table 1 and 2 above yield a combination of good elastic modulus with quite acceptable processing temperatures. As can be seen in FIG. 1, none of the glass fibres disclosed in the prior art comprises the claimed values of $22.0<MgO+CaO\leq35.0$ wt % for the corresponding values of ($MgO+Al_2O_3$) comprised between 27 and 44 wt %.

For example, the R-fibres disclosed in FR1435073 (✵ -stars in FIG. 1) comprise high amounts of ($MgO+Al_2O_3$) and, in particular, high amounts of $Al_2O_3$, and low amounts of ($MgO+CaO$) ranging between 15 and 21 wt % (cf. Examples 1 to 3 of FR1435073). High amounts of $Al_2O_3$ and low contents of ($MgO+CaO$) were found detrimental to processing conditions, with liquidus temperatures of up to 1350° C. and a mean value of the temperature of the melt corresponding to a viscosity of $10^3$ poise (=T log 3) of about 1405° C. reported therein (cf. FIG. 2). Although an $Al_2O_3$ amount ranging from 20 to 30 wt % and an MgO amount of 5 to 20 wt % are claimed, the preferred ranges are 24 to 26 wt % $Al_2O_3$, and 6 to 16 wt % MgO, as confirmed by the examples all comprising 25 to 26 wt % $Al_2O_3$. In our opinion, such high amounts of $Al_2O_3$ together with low amounts of ($MgO+CaO$), even when combined with high amounts of MgO, increase the risk of devitrification and are detrimental to the viscosity of the melt and fiberization conditions which, together with the high processing temperature (T log 3), impact on the production costs. The fibres of the present invention avoid these drawbacks by using more than 21 wt % of ($MgO+CaO$), which can be seen to enhance the values of both T log 3 and of the modulus (cf. FIGS. 4A and 4B).

EP1641717 (white diamond in FIG. 1), filed about 40 years after FR143073, proposes glass fibre compositions maintaining the good mechanical properties of the R-glass fibres disclosed in the latter document, with substantially higher amounts of ($MgO+CaO$) but concomitantly with much lower amounts of ($MgO+Al_2O_3$) not exceeding 26.9 wt % (cf. Ex. 6 of EP1641717). The teaching of EP1641717 is clearly to not go above this limit as this would go back towards the teaching given in FR143073, the very teaching that the formulations of EP1641717 intend to enhance. Note that the mean specific modulus of the glasses disclosed in EP1641717 is 1.2 MPa $kg^{-1}$ $m^3$ lower than the one of the glasses according to the present invention (cf. FIG. 3). Similarly, the mean value of T log 3 is about 44° C. higher than the one of the glasses according to the present invention (cf. FIG. 3).

Later, one of the inventors of the preceding application discloses in WO2009/138661 (X-crosses in FIG. 1) an improvement over the fibres disclosed in EP1641717 with glass fibres comprising slightly higher amounts of ($MgO+Al_2O_3$) (=28.3 to 30.8 wt %) but with substantially lower amounts of ($MgO+CaO$) (=15.1 to 18.3 wt %). The glass of WO2009/138661 has a specific modulus comparable with the one of the glass of the present invention, which is higher than the one of the preceding document (cf. FIG. 3). It has, however, a higher mean value of T log 3 than the one of the preceding patent application (cf. FIG. 2). Surprisingly, it has been found that by increasing the amounts of both (MgO+CaO) and (MgO+$Al_2O_3$) above the ranges disclosed in the preceding two documents, glass fibres with excellent properties and low processing temperatures (T log 3) can be produced.

GB1391384 discloses glass compositions comprising (MgO+CaO) spanning the whole range of the abscissa as depicted in FIG. 1, from 15 to 35 wt %. The amounts of (MgO+$Al_2O_3$) all range between 10 and 20 wt % with two exceptions out of over 75 examples, with (MgO+$Al_2O_3$) values of 26.5 and 27.1, respectively (cf. Ex. 16 of Table 5 and EX. 7 of Table 4 of GB1391384), the latter, however, having a low value of (MgO+CaO) of 18.9 wt %. The T log 3 of the glasses disclosed in this document are quite low, with a mean value lower than 1200° C., but there is no mechanical data disclosed therein. There is certainly no teaching in this document to combine high amounts of (MgO+CaO) and (MgO+$Al_2O_3$) as proposed by the present invention.

CA1045641 (white squares in FIG. 1) and U.S. Pat. No. 3,892,581 (white triangles) disclose glass fibres for composites reinforcement comprising 16.3-18.5 wt % $Al_2O_3$, 8.5-12.7 wt % CaO, and 6.6-10.5 wt % MgO, with examples characterized by (MgO+$Al_2O_3$) amounts of the order of 23-28 wt % and (MgO+CaO) of up to 23.2 wt %, but never with both contents comprised within the claimed ranges: a higher amount of one of (MgO+$Al_2O_3$) and (MgO+CaO) being systematically compensated by a lower amount of the other. The inventor of U.S. Pat. No. 3,892,581 stresses that "the combination of the components at the levels designated impart the necessary properties to the glass fibers formed therefrom", thus clearly indicating that higher amounts and proportions of MgO, CaO, and $Al_2O_3$ are not desirable.

Figure 2:
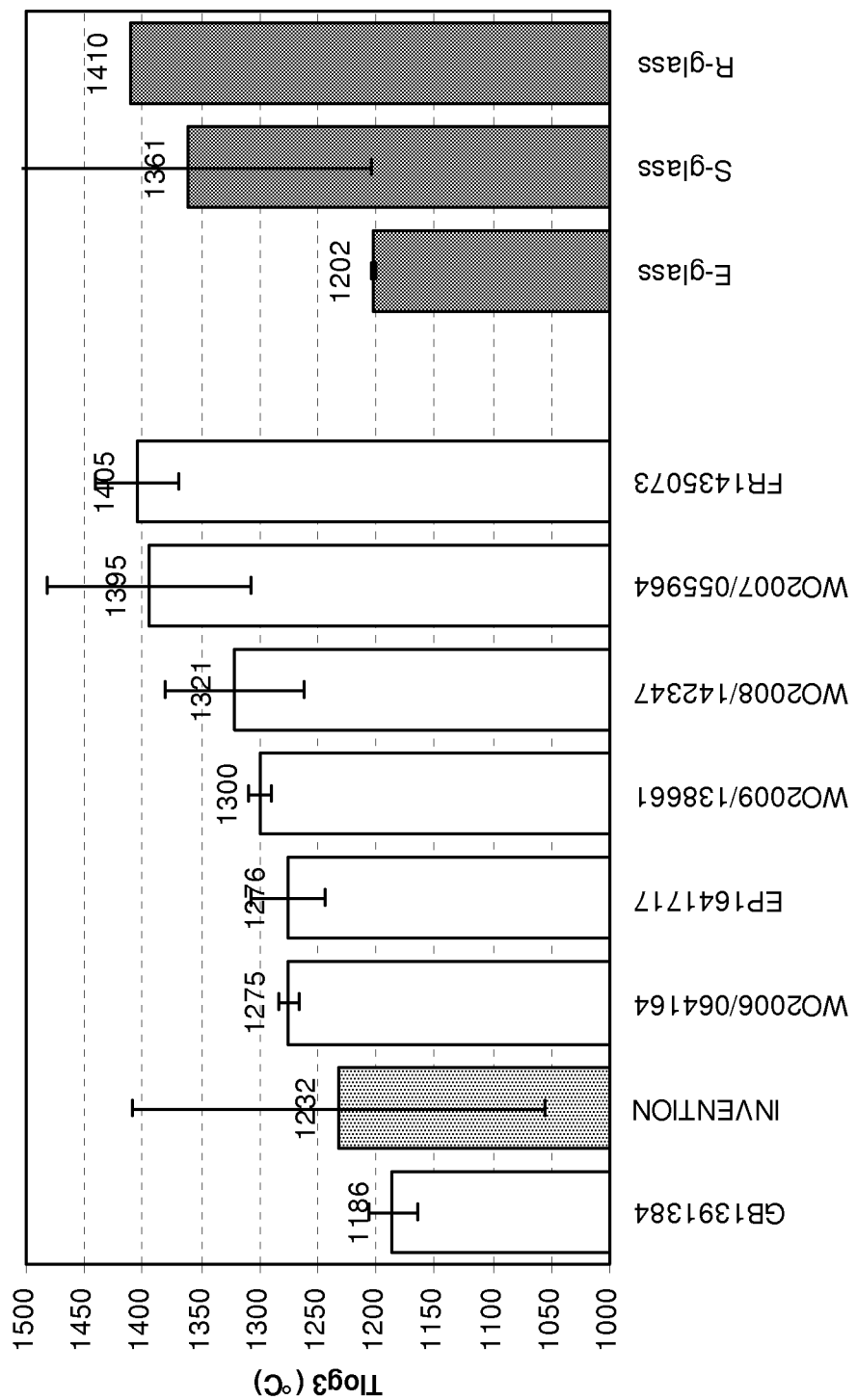
FIG. 2: shows the mean T log 3 values of glasses according to the present invention compared with values published in the prior art revised supra.

The fibres disclosed in WO2007/055964 and WO2007/055968 (grey circles in FIG. 1) contain 20 to 31.3 wt % of (MgO+$Al_2O_3$) with, however, lower amounts of (MgO+CaO) never higher than 19.54 wt %. As can be seen in FIG. 2, the temperature of the melt corresponding to a viscosity of $10^3$ poise (=T log 3) of the glass fibre formulations disclosed in these documents is quite high with a mean value of 1395° C., about 160° C. higher than the mean value of T log 3 measured on the formulations according to the present invention (cf. FIG. 2). These substantially higher processing temperatures are detrimental to the economics of the fibres disclosed in WO2007/055964 and WO2007/055968 compared with the fibres according to the present invention. The specific modulus of these glasses is of the order of the one of E-glass and therefore considerably lower than the one of the glass of the present invention (cf. FIG. 3).

The glass fibres disclosed in WO2008/142347 (grey triangles in FIG. 1) have rather low amounts of both (MgO+$Al_2O_3$) and (MgO+CaO). The mean value of T log 3 of the formulations disclosed in WO2008/142347 is 1321° C., which is about 90° C. higher than the mean value measured on the glass formulations according to the present invention (cf. FIG. 2). The specific modulus of the glass disclosed in this document is even lower than the one of E-glass and these fibres are therefore not the most suitable ones for applications where high stiffness and low weight are desired (cf. FIG. 3).

WO2006/064164 (grey squares in FIG. 1) discloses several formulations with combined amounts of (MgO+CaO) ranging from 21 and 23.6 wt % but with lower amounts of (MgO+$Al_2O_3$) never greater than 24.7 wt %.

Contrary to the conservative trend observed in the prior art as revealed supra, a totally novel and unexplored area of glass fibre formulations characterized by substantially higher amounts of both (MgO+CaO) and (MgO+$Al_2O_3$) than hitherto applied has shown to yield excellent mechanical properties with exceptionally low T log 3 values (cf. FIGS. 2 and 3). The higher amounts of both (MgO+CaO) and (MgO+$Al_2O_3$) according to the present invention require higher amounts of MgO, $Al_2O_3$, and CaO than generally used in combination, preferably with $Al_2O_3$ amounts of 7 to 25 wt %, CaO amounts of 5 to 20 wt %, and MgO amounts of 8 to 25 wt %, preferably of at least 12 wt %, more preferably at least 13 wt % and even at least 15 wt %.

In yet another embodiment of the present invention, the combined content of (MgO+CaO) is at least equal to 23.5 wt %, preferably at least 24 wt %, or even greater than 25 wt %. This has been found to enhance stiffness and lower T log 3 and liquidus temperatures. A content of $Al_2O_3$ of at least 13 wt % is preferred, but the combined content of $SiO_2+Al_2O_3$ is preferably less than 79 wt %. It was found that, contrary to what was taught in WO2009/138661, glasses with a combined amount of $SiO_2+Al_2O_3$ lower than 79 wt % yielded very good properties. Preferably, this amount is at least 65 wt %, more preferably, at least 66 wt %, and most preferably, it is comprised between 66 and 75 wt %.

In view of their high stiffness (cf. Table 1) the glass fibres of the present invention are particularly suitable for use as reinforcement in composite materials with an organic or inorganic matrix. The reinforcement fibres can be present as continuous yarns or short fibres. In view of the high performance of the present fibres, they are preferably used as continuous yarns in so called advanced composite materials. These can be used as unidirectional filaments, like in filament winding, particularly suitable for the production of pressure vessels, or can be woven, braided, or knitted to form a series of 2-D or 3-D reinforcement preforms well known to the persons skilled in the art.

The composite materials produced with the glass fibres of the present invention may have an inorganic matrix, but composite materials with an organic matrix are particularly preferred. In particular, the fibres of the present invention may be used with thermoset resins, thermoplastic polymers, or elastomers alike. In the case of thermoset resins, the fibres may be impregnated in the composite forming tool (e.g., RTM, sheet moulding, or filament winding) or pre-impregnated forming a prepreg or a tow-preg. For thermoplastic polymers, direct impregnation of dry fibres is probleamtic because of the generally high viscosity of thermoplastic melts, and a solvent is then required to lower the viscosity. But solvent extraction after formation is time and energy consuming and raises serious environmental concerns. It is preferred to produce tow-pregs wherein the glass fibres are intimately mingled with the thermoplastic matrix present either as a powder or as filaments. As is the case with glass-thermoset prepregs, the glass-thermoplastic towpregs are impregnated and consolidated in a tool under elevated temperature and pressure. Unlike the thermoset composites, the thermoplastic matrix must be cooled below its melting temperature prior to extracting the composite part from the tool.

Composite materials reinforced with the fibres of the present invention can advantageously be used for the manufacturing of a number of advanced engineering parts, such as panels in the automotive and aerospace industries, pressure vessels, and windmill blades.

Panels or more intricate functional parts in e.g., the automotive and aerospace industries may be produced by any processing technique known in the art, such as resin transfer moulding (RTM), compression moulding, vacuum bagging, autoclave forming, filament winding, etc. Pressure vessels can advantageously be produced by filament winding. Alternatively, they can be produced by laying the fibres, e.g., as a braided or knitted preform on an inflatable bladder and the whole system is then placed into a closed tool defining a cavity. Resin is either injected if the fibres are dry, or in case of prepregs or tow-pregs, the temperature is raised and the bladder inflated to press the fibres and matrix against the inner walls of the tool defining the cavity to drive impregnation of the fibres.

Windmill blades may be produced by winding roving tapes or roving bundles around a core or mandrel, as disclosed e.g., in U.S. Pat. No. 4,242,160 and 4,381,960. They can also be manufactured by joining two half-shells produced e.g., by compression moulding, vacuum bagging, autoclave forming, or stamping prepregs. The joining is generally carried out with an adhesive which is critical and may constitute a weak part of the blade. Depending on the matrix, resin curing may advantageously be carried out by exposure to UV radiation or heat. In case of thermoplastic polymers, the temperature cycle includes heating above and cooling below the melting temperature prior, respectively, after the fibre impregnation stage. Windmill blades may also be produced by RTM, the blades comprising a foam core or the tool being designed with a removable core (cf. e.g., US2003116262).

The invention claimed is:

1. A glass fibre of quaternary composition comprising:
48.7 to 65 wt. % of $SiO_2$,
17.5 to 25 wt. % of $Al_2O_3$,
5 to 20 wt. % of CaO,
8 to 16 wt. % of MgO, and comprising less than 3.3 wt. % of $B_2O_3$ and less than 2.0 wt. % of fluorine, wherein:
22.0<MgO+CaO≤35.0 wt. % and
27.0≤MgO+$Al_2O_3$≤41 wt. %
all amounts being expressed in weight % with respect to the total weight of the composition.

2. The glass fibre according to claim 1, wherein: (MgO+$Al_2O_3$)≤40.0 wt. %.

3. The glass fibre according to claim 1, wherein (MgO+CaO)≥23.5 wt. %.

4. The glass fibre according to claim 1, wherein the content of MgO is comprised between 11 and 16 wt. %.

5. The glass fibre according to claim 1, wherein:
17.5 wt. %≤$Al_2O_3$<20 wt. %.

6. The glass fibre according to claim 1, wherein:
$SiO_2$/ (MgO+CaO) ratio is comprised between 1.80 and 2.30.

7. The glass fibre according to claim 1, wherein:
$SiO_2$/ (MgO+CaO) ratio is comprised between 1.39 and 2.0, and/or
$Al_2O_3$/ (MgO+CaO) ratio is comprised between 0.50 and 1.14.

8. The glass fibre according to claim 1 comprising substantially no boron oxide and/or substantially no fluorine.

9. A composite material comprising an organic or inorganic matrix reinforced with glass fibres according to claim 1.

10. A method for manufacturing, windmill blades, pressure vessels, or parts in fields of automotive, aeronautics, or ballistics comprising forming a composite material reinforced with glass fibres according to claim 1.

11. A windmill blade comprising a skin or shell made of a composite material reinforced with glass fibres according to claim 1.

12. A pressure vessel made of a composite material reinforced with glass fibres according to claim 1.

13. A product in fields of automotive, aeronautics, or ballistics made of a composite material reinforced with glass fibres according to claim 1.

14. Glass fiber according to claim 1, comprising:
49.8 to 65 wt. % of $SiO_2$;
17.5 to 18.7 wt. % of $Al_2O_3$;
5 to 13 wt. % of CaO; and
9.8 to 25 wt. % of MgO.

15. A product in fields of automotive, aeronautics, or ballistics made of a composite material reinforced with glass fibres according to claim 14.

* * * * *